United States Patent
Parker et al.

(10) Patent No.: US 7,247,263 B2
(45) Date of Patent: Jul. 24, 2007

(54) FIRE-BARRIER COMPOSITION

(75) Inventors: Dennis C. Parker, Sparks, MD (US); Anthony W. Carignano, Baltimore, MD (US); David L. Ruff, Freeland, MD (US); Robert J. Purcell, Glen Arm, MD (US)

(73) Assignee: ITC Minerals & Chemicals, Hunt Valley, MD (US)

( * ) Notice: Subject to any disclaimer, the term of this patent is extended or adjusted under 35 U.S.C. 154(b) by 250 days.

(21) Appl. No.: 10/696,197

(22) Filed: Oct. 29, 2003

(65) Prior Publication Data

US 2004/0124403 A1    Jul. 1, 2004

Related U.S. Application Data

(60) Provisional application No. 60/424,118, filed on Nov. 5, 2002.

(51) Int. Cl.
*A62D 1/00* (2006.01)
*C09K 21/02* (2006.01)

(52) U.S. Cl. .......... 252/609; 252/2; 252/601; 169/45; 169/48; 428/920; 428/921

(58) Field of Classification Search .......... 252/2, 252/609, 601; 169/45, 48; 428/920, 921
See application file for complete search history.

(56) References Cited

U.S. PATENT DOCUMENTS

| | | | | |
|---|---|---|---|---|
| 3,196,108 A | * | 7/1965 | Nelson | 169/44 |
| 4,216,136 A | * | 8/1980 | Stayner | 524/405 |
| 4,983,326 A | | 1/1991 | Vandersall | 252/603 |
| 5,035,951 A | | 7/1991 | Dimanshteyn | 428/446 |
| 5,130,184 A | * | 7/1992 | Ellis | 442/295 |
| 5,204,154 A | * | 4/1993 | Drew et al. | 428/68 |
| 5,518,638 A | | 5/1996 | Buil et al. | 252/2 |
| 5,709,821 A | | 1/1998 | von Bonin et al. | 252/315.01 |
| 6,019,176 A | | 2/2000 | Crouch | 169/46 |
| 6,130,179 A | * | 10/2000 | Sampson et al. | 502/62 |
| 6,168,834 B1 | | 1/2001 | Hallo et al. | 427/372.2 |
| 6,245,252 B1 | | 6/2001 | Hicks et al. | 252/8.05 |
| 6,395,200 B2 | * | 5/2002 | Crouch et al. | 252/603 |
| 6,432,322 B1 | * | 8/2002 | Speronello et al. | 252/187.23 |
| 6,444,601 B1 | * | 9/2002 | Purcell et al. | 502/62 |
| 6,482,473 B1 | | 11/2002 | Hallo et al. | 427/372.2 |

* cited by examiner

*Primary Examiner*—Kriellion Sanders
(74) *Attorney, Agent, or Firm*—Armstrong, Kratz, Quintos, Hanson & Brooks, LLP

(57) ABSTRACT

The invention is directed to a system which allows for the rapid application of a water immobilizing dispersion in sufficient quantities to increase the fire protective and wetting characteristics of water. This system also increases the evaporative cooling and quenching effects of water. The primary constituents of the composition of this system are water, purified Attapulgite clay, and an environmentally safe salt, e.g., magnesium sulfate.

10 Claims, No Drawings

FIRE-BARRIER COMPOSITION

RELATED APPLICATION

This application is related to application Ser. No. 60/424,118 filed Nov. 5, 2002.

FIELD OF THE INVENTION

The herein disclosed invention finds applicability in the field of fire prevention and control, as well as, the prevention of damage which could be caused by fire.

BACKGROUND OF THE INVENTION

Water removes heat from fire via evaporative cooling which in turn creates steam. Atomized water, in the physical state of steam/mist, starves a fire of oxygen and ensures that combustion or ignition cannot be sustained. When substrates adjacent to fire are saturated with water, a fire must provide enough heat to evaporate the water from the substrate before the substrate combusts.

The advantages of using water as an evaporative cooling agent against fire are its high heat absorbing capacity, a lack of toxicity, low cost and relatively good availability. However, a known disadvantage of water is its high fluidity. Water alone as a temporary suppressant against fire is inefficient due to excess run-off and an inability to sufficiently wet-out and absorb into high contact angle substrates. As such, significant manpower and time must be expended to re-soak high contact angle areas exposed to fire from which water has runoff or evaporated.

Prior Art Patents

U.S. Pat. No. 6,245,252 issued to Stockhausen GmbH & Co. KG teaches a cross-linked, water-swellable additive polymer in water/oil emulsion produced by an inverse phase polymerization reaction to be added to the firefighting water. This patent is directed to polymer systems and is deficient for the following reasons:

1. Although Acti-Quench is similar in functional concept to fire fighting foams and gels, such as these shown by Stockhausen, there is an important difference. Traditional "polymer shelled" gels depend on entrainment of water as a primary fire inhibitor. After the dissipation of all water from the polymer structures, the "polymer shells" constituting the structure is no longer useful as a fire barrier. In fact, without water the "polymer" is flammable.

2. Further, water-swellable polymers do not shear thin or exhibit pseudo-Thixotropic characteristics when used with standard fire fighting eduction systems.

3. Although water-swelling polymers are quite effective in creating a unique protective barrier, these polymeric systems are highly susceptible to UV sun-light destabilization.

4. Water-swelling polymer systems have a limited ambient storage range of 0–40° C.

5. Super absorbent polymers expand enormously and become extremely heavy in the process, thus, posing mechanical hazards due to clogging and the bursting of eduction equipment and in addition, the polymers have the potential for collapsing unstable structures due to the added weight of water.

6. Water-swelling polymers can only be effectively used with plain water. Highly valent contaminants such as detergents or ionic chemical salts disrupt the absorbency and heat resistant nature of water-swellable polymers thus causing a premature swelling and seizing of the polymer system.

U.S. Pat. No. 6,019,176 issued to Fire-Trol Holdings L.L.C., relates to "fire suppressant compositions, and methods of preparing and using such compositions consisting of: "water, at least about 5% by weight of a fire retardant salt and at least 1.5% by weight of ammonium thiosulfate along with other optional functional components such as corrosion inhibitors, suspending agents, coloring agents, antimicrobials and stabilizers." This patent is deficient because said ammonia salt is highly corrosive to fire fighting equipment and has been proven to be environmentally toxic.

U.S. Pat. No. 5,518,638 to Buil et al discloses the use of Attapulgite and water-soluble salts for fire extinguishing formulations. This patent is deficient in not disclosing the purified Attapulgite clay covered in an embodiment of this invention and is also deficient in not showing the use of salts along with Attapulgite clay.

Additional Prior Art Patents

Dimanshteyn (U.S. Pat. No. 5,035,951) teaches alkali silicates and kaolin as fire-protectant materials.

Vandersall (U.S. Pat. No. 4,983,326) shows diammonium phosphate and diammonium sulfate to be fire-control agents.

Von Bonin et al (U.S. Pat. No. 5,709,821) teaches aluminum phosphate as a gel-former in fire protectant compositions. Specifically taught are gel formers comprising acid aluminum phosphate and a reaction product of boric acid and an alkanolamine, along with alkali metal compounds in the aluminum.

Hallo et al, U.S. Pat. No. 6,168,834 and U.S. Pat. No. 6,482,473 disclose compositions for dissipation of heat comprising a mineral clay, water and a surfactant. The compositions are used mainly to dissipate heat in welding and soldering processes.

Prior Art Reference

United Nations' website http://www.fao.org/docrep/q2570e/g2570eog.jpg makes mention of the use of attapulgite as a fire retardant at low concentrations.

SUMMARY OF THE INVENTION

In the most preferred embodiments of this invention, the Attapulgite clay is that described in U.S. Pat. No. 6,444,601 to Purcell et al and U.S. Pat. No. 6,130,179 to Sampson et al. The disclosures of these patents particularly as to the purified Attapulgite clay are incorporated herein by reference. The compositions of this invention may encompass ordinary Attapulgite clay or purified Attapulgite clay.

The water used to create the novel dispersion outlined in this invention disclosure may originate from any potable or non-potable source which would commonly be used in fighting fires.

The invention is directed to the water immobilization with a non-combustible purified Attapulgite clay for use as an environmentally safe temporary protective coating.

Acti-Quench™ as used herein is an aqueous concentrate consisting of a micronized self-dispersing hydrous magnesium alumino silicate (purified Attapulgite clay), water and a flocculating agent. Dispersed to a film thickness of ¼ inch or greater, Acti-Quench will adhere to most horizontal and vertical surfaces to form an inert temporary protective coating against fire and heat. Acti-Quench is most suitable for Class A & B fire substrates such as: roofs, ceilings, glass windows, wooden decks, marina docks, trees, shrubs, plants, and grass. Acti-Quench is non-toxic, environmentally safe, removable with pressurized water and ejectable with most common fire-fighting equipment systems. Furthermore, the natural mineral from which Acti-Quench is produced is recognized by the U.S. Food and Drug Administration as safe for human and animal contact and is commonly used in consumer products such as pharmaceuticals, cosmetics and animal feed additives.

Exemplary of a preferred embodiment of this invention is a water immobilizing, environmentally safe, temporary protective coating comprising a purified Attapulgite clay at about 13.5 to 15% (total weight basis), Epsom salt at about 1% (total weight basis) and water at about 85% (total weight basis). This embodiment is a preferred embodiment but as readily understood by those skilled in the art, the proportions can be varied without departing from the spirit of this invention.

The inventors have discovered that higher loadings of Epson Salt in their Acti-Quench formulation has no negative affect on the overall viscosity, sprayability, eductability or pumpability of their novel invention. In fact, the formulation could be loaded with 20% Epson salts and 15% purified Attapulgite clay and used as a high contact angle temporary fire barrier.

As a further embodiment of the invention, the inventors envision compositions containing about 5–15% purified Attapulgite clay, about 1–15% magnesium sulfate (Epsom salt) with water to make 100%. It is important that not too much purified Attapulgite be added since that would make application by spraying difficult.

The specific amounts of Attapulgite clay, Epsom salt and water as herein set forth are deemed to be effective amounts used in fire prevention, fire protection and fire control.

The disclosed invention encompasses the use of clays other than Attapulgite, as for example, Palygorskite or Sepiolite.

Additives such as carbonates, borates and phyllosilicates can be added to improve the inventive composition.

The herein disclosed invention embodies a high contact angle char forming adherent comprising of:
  i. a pseudo-nano particulate magnesium Alumino silicate;
  ii. water in sufficient amounts to disperse said adherent to form a colloidal suspension of 5% to 19% by weight in water;
  iii. a flocculating agent selected from water soluble salts containing: Na, Cl, K, Mg, Sr, Ca, Li, Br or $SO_4$ but optimally Epsom salt (magnesium sulfate) and when mixed with water soluble salts, will produce a eductable and sprayable composition from which a thickened char forming suspension is formed and will optionally include;
  iv. an additive selected from the group consisting of carbonates, borates or phyllosilicates such as micas or vermiculite.

A step-by-step process for making an Acti-Quench composition is accomplished by:
  i. shear mixing between 5–19 percent formula weight of Acti-Quench with water to create a dispersion;
  ii. mixing between 0.25–50 percent formula weight of a flocculant to the dispersion;
  iii. mixing an ameliorative fire suppression and quenching additives to the dispersion;
  iv. retaining the dispersion in a pumpable spray container and;
  v. discharging the dispersion from the container in a shear thinning spray action, whereby a sprayable high contact adherent temporary protective coating is formed.

The herein disclosed invention embraces compositions useful for providing a fire protective coating on surfaces by immobilizing water therein and producing evaporative cooling comprising about 5–15% Attapulgite clay, about 1–10% magnesium sulfate with water to make 100%.

Further compositions of this invention include compositions comprising about 13.5–15% Attapulgite clay, about 1% magnesium sulfate and the balance water to make 100%. In a specific embodiment, Attapulgite clay is purified Attapulgite clay.

The herein disclosed invention envisions a method for preventing the advance of a fire and creating a fire-barrier comprising applying to the area to be protected from the advancing fire a fire-barrier composition comprising fire-barrier effective amounts of a composition of Attapulgite clay, Epsom salt and water. More specifically, the fire-barrier composition comprises on a total weight basis 5–15% purified Attapulgite clay, 1–15% Epsom salt and water to make 100%, and still more specifically, the fire-barrier composition on a total weight basis comprises about 13.5 to 15% of Attapulgite clay, about 1% Epsom salt and about 85% of water.

In the application of the method the composition is applied to the area to be protected in an amount of a quarter of an inch or greater.

The invention finds applicability in protecting areas around a land-fill, and the area around burning tires.

In an important embodiment of the invention, a method for preventing the advance of a fire and creating a fire-barrier comprising applying to the surface to be protected an aqueous slurry of a clay selected from the group consisting of Attapulgite, Palygorskite or Sepiolite is envisioned.

A method for fighting a fire comprising applying to said fire a composition of Attapulgite clay, Epsom salt and water in amounts effective to fight said fire. The effective amounts of the ingredients are those found in this patent disclosure.

The ingredients must be properly mixed in ratios determined by the effect desired of the applied system. The following factors should be taken into account:
  A. The amount of water immobilized is a function of the thickness of the immobilized water.
  B. The thickness of the immobilized water coating is proportional to the amount of purified Attapulgite clay forming the gel structure.
  C. The film thickness resulting from evaporation is determined by the % wt. solids of the clay/gel structure.
  D. The immobilization of water can be accomplished at lower purified Attapulgite clay solids. The formation of effective films is accomplished with higher clay and magnesium sulfate solids.

The system increases the efficiency of water utilization by immobilizing the water where applied. Water is prevented from migrating to untreated areas which inhibits unnecessary water damage.

The ingredients of the system are generally recognized as a safe for environmental and human contact. Each ingredient is consumed by humans and animals as water, medicine or is used for therapeutic purposes.

Flocculants

Most clay flocculants are either multivalent cations such as calcium, magnesium and aluminum, or long-chain polymers.

Flocculation occurs with purified Attapulgite clay after mechanical agitation ceases and the dispersed rods of purified Attapulgite spontaneously form flocs or small charged particles structures with attractions between its negative and positive charges. Although suitable flocculating agents for purified Attapulgite clay can be selected from any group of multivalent cationic materials or long-chain polymers, the inventors have discovered that water soluble salts, optimally magnesium sulfate (Epson Salt), are most suitable for flocculating purified Attapulgite. Magnesium sulfate in the form of Epsom salt is preferred because it is non-toxic, friendly to the environment, non-corrosive, cost effective, readily available, has good char-forming fire retardant properties and has the ability to intumesce.

Many advantages are realized by the use of this invention such as for example:

A. Absorption Rate: Anti-quench absorbs up to 200% of its weight or more in water.

B. Rheology: Acti-Quench's shear thinning rheology is reversible and reproducible. It allows Acti-Quench's to be rapidly pump-sprayed in large volumes onto all contact angles.

C. Evaporative Cooling: Acti-Quench exhibits a two phase evaporative cooling process followed by char formation. During the first phase (50–100° C.) absorbed water is evaporatively released from Acti-Quench's outer surface and interstitial water reservoirs. During the second phase (100–915° C.) water is evaporatively released through dehydrolization. When completely dehydrolized under fully exposed direct flame conditions, caramelizing and the formation of a "char barrier" occur. Acti-Quench's evaporative cooling and char formation process minimize the manpower and material resources necessary to periodically re-soak a surface under threat of reignition. However, prolonged exposure to +800 C temperatures will fully dissipate Acti-Quench's water reservoirs and char layers.

D. Miscibility: Acti-Quench is miscible in fresh, salt or brackish water without the inclusion of chemicals to counteract water hardness.

E. Product Life & Stability: Extremes in ambient storage temperature do not affect the long-term stability or performance of Acti-Quench. Unlike super absorbent polymers, UV light has no affect on Acti-Quench. Wind evaporation has limited affect on the overall stability and performance of Acti-Quench.

F. Functionality & Usability: Acti-Quench slows the evaporative process of plain water, thus making water more efficient in cooling and protecting against fire. As an aqueous gel, Acti-Quench combines the desired benefits of high water absorption, low shear pumpability, high contact angle adherence and inertness to retard the damaging affects of fire and structures located near fire. As a concentrate Acti-Quench is miscible with fire-fighting water via standard fire fighting eduction or batch mixing equipment.

G. Disposability: Acti-Quench washes safely into residential drainage pipes, storm sewers or into the soil with no fear of obstruction, rupture or environmental impact.

Acti-Quench Used as a Water Additive when Extinguishing Fire:

When water is sprayed directly onto a fire, much of the water never effectively fights the fire, because the superheated air above the fire evaporates the water before the water can reach the flames. When Acti-Quench is used, the same principles of heat absorption allow more water to reach the fire. Because water-laden Acti-Quench has a greater surface area than a single water molecule, the evaporation process is slowed. More water reaches the fire and the fire is doused with less water than when simply using water or conventional additives like fire fighting foams or gels. When simply applying water, a large proportion of the water runs off and is wasted. Acti-Quench coats ashes and creates a char barrier instead of running off of contact angles and soaking into the ground. Acti-Quench's adherent characteristics help to prevent re-flashing by depriving substrates of oxygen needed for re-ignition.

The system immobilizes water by three methods:

A. Gellation—purified Attapulgite clay will form a gel structure when dispersed in water in the presence of a soluble salt.

B. Adsorption—the surface area of the clay will adsorb two times its weight of water. This water will evaporate at temperatures below 100° C., providing evaporative cooling to the substitute.

C. Absorption—the purified Attapulgite clay has molecular water of hydration which is released at elevated temperatures from 100° C. to 915° C.

The immobilized water forms a coating on the substrate. The coating increases the amount of water that can evaporate resulting in a lower substrate temperature. The rate of evaporation depends on the delta T between the temperature of the heat source and the temperature of water fixed on the substrate by the system. The evaporation of water by the heat source consumes energy that would otherwise be used by the fire to combust the substrate. The combustion of the substrate is inhibited or prevented as a result of the application of the system.

The evaporation of adsorbed water results in the formation of a char promoting film of purified Attapulgite clay which retards the transmission of heat by four methods.

A. The inorganic film is a physical, non-combustible substrate.

B. The inorganic film acts as an insulator because it has the capacity to absorb heat.

C. The film releases molecular water as the temperature of the substrate or film increases thus causing evaporative cooling.

D. The film dissipates heat laterally across the substrate resulting in lower average substrate temperature.

Comparison of Ignition Delay Times on Painted Wood

The results of ignition delay measurements obtained at 25 and 15 kW/m$^2$ of irradiance1 on painted wood without any treatment, with water treatment, and with the three products treatment are shown in Tables 1 and 2. The treated specimens had not been dried before testing.

The effects of drying on ignition delay times at 25 and 15 kW/m$^2$ of irradiance on treated painted wood are shown in Tables 3 and 4.

Barricade™ is said to be a liquid concentrate composed of super absorbent polymers.

Nochar Fire Preventer™ is a Non-Toxic, Non-Hazardous Fire Retardant for all unsealed natural fiber materials and products. Nochar Fire Preventer is a water-soluble product that uses water as a carrier to penetrate the fiber. The water is then dried off or driven off, leaving the retardant in place.

TABLE 1

Treatment versus No Treatment on Painted Wood at 25 kW/m$^2$ with Igniter

| No. of Tests | Treatment* | Ignition Delay (s) Average based on No. of Tests |
|---|---|---|
| 3 (3)** | None | 32 (84) |
| 2 (3) | Water | 58 (98) |
| 5 | Barricade | 557 |
| 5 | Nochar | 538 |
| (3) | Acti-Quench ™ | (529) |

*These specimens were tested without any drying
**Numbers without parentheses are related to Omega Point Labs work as described in their article, numbers in parentheses in all the tables are related to Pacific Fire Labs work.

TABLE 2

Treatment versus No Treatment on Painted Wood at 15 kW/m² with Igniter

| No. of Tests | Treatment* | Ignition Delay (s) Average based on No. of Tests |
|---|---|---|
| 2 (3) | None | 171 (373) |
| None (3) | Water | NA (290) |
| 3 | Barricade | 742 |
| 5 | Nochar | 484 |
| (3) | Acti-Quench ™ | (914) |

1 The total incident heat flux in the area of the igniter flame was about 2.7 kW/m² higher than the irradiance.

TABLE 3

Effects of Drying on Treated, Painted Wood at 25 kW/m² with Igniter

| No. of Tests | Treatment | Drying Period (min.) | Ignition Delay (s) Average Based on No. of Tests |
|---|---|---|---|
| 2 (3) | Water | None | 58 (98) |
| 2 (None) | Water | 60 | 99 (NA) |
| 5 | Barricade | None | 557 |
| 2 | Barricade | 60 | 384*** |
| 5 | Nochar | None | 538 |
| 2 | Nochar | 60 | 395 |
| (3) | Acti-Quench ™ | None | (529) |
| (3) | Acti-Quench ™ | 60 | (465) |

***This is an assumed number, the value in the Omega Point Labs article is 3842332.

TABLE 4

Effects of Drying on Treated, Painted Wood at 15 kW/m² with Igniter

| No. of Tests | Treatment | Drying Period (min.) | Ignition Delay (s) Average based on No. of Tests |
|---|---|---|---|
| None (3) | Water | None | NA (290) |
| None (None) | Water | 60 | NA (NA) |
| 3 | Barricade | None | 742 |
| 1 | Barricade | 60 | 443 |
| 1 | Barricade | 120 | 421 |
| 2 | Nochar | None | 484 |
| 1 | Nochar | 60 | 683 |
| 1 | Nochar | 120 | 620 |
| (3) | Acti-Quench ™ | None | (914) |
| (3) | Acti-Quench ™ | 60 | (724) |
| (3) | Acti-Quench ™ | 120 | (354) |

The comparison of the effects of treatments with various products on ignition delay for painted and vinyl siding, and time of glass cracking is shown in Table 5. The non-treated painted wood vinyl siding and window glass results are included for additional comparison. The Acti-Quench results can not be directly compared to other products due to the 60 minute drying period before testing. No drying period was used for the other products in the Omega Point Labs tests.

TABLE 5

Comparison of Treatment versus, no Treatment on Painted Wood, Vinyl and Windows at 25 Kw/m² with Igniter, no Drying Period (Except for Acti-Quench ™)

| No. of Tests | Treatment | Siding* | Ignition Delay (s) Average based on No. of Tests |
|---|---|---|---|
| 3 | None | Painted Wood | 32 (84) |
| 1 | None | Vinyl | 45 (86)(plastic sagged/melted) |
| 2 | None | Small Window | 106 (96) (time to cracking) |
| 5 | Barricade | Painted Wood | 557 |
| 1 | Barricade | Vinyl | 130 (plastic sagged/melted) |
| 2 | Barricade | Small Window | 528 (time to cracking) |
| 5 | Nochar | Painted Wood | 538 |
| 1 | Nochar | Vinyl | 521 (plastic sagged/melted) |
| 2 | Nochar | Small Window | 558 (time to cracking) |
| (3) | Acti-Quench ™ | Painted Wood | (529) |
| (3) | Acti-Quench ™ | Vinyl | (264)* (plastic sagged/melted) |
| (3) | Acti-Quench ™ | Small Window | (401)* (time to cracking) |

*In the Pacific Fire Laboratory, Inc. protocol the Acti-Quench ™ treated vinyl siding and window were dried 60 minutes prior to testing.

Evaluation of Mass Loss Rate Measurements

FIG. 1 shows that the mass loss rates for the untreated painted wood, the water treated painted wood, and the Acti-Quench™ treated and 120 minutes dried painted wood specimens were about the same. However, the mass loss rates for the Acti-Quench™ treated specimens that were not dried or were only dried 60 minutes are significantly higher. The mass loss rates of the Barricade and Nod: products (according to Omega Point Labs) were the same for all the untreated and treated, either dried or not dried specimens.

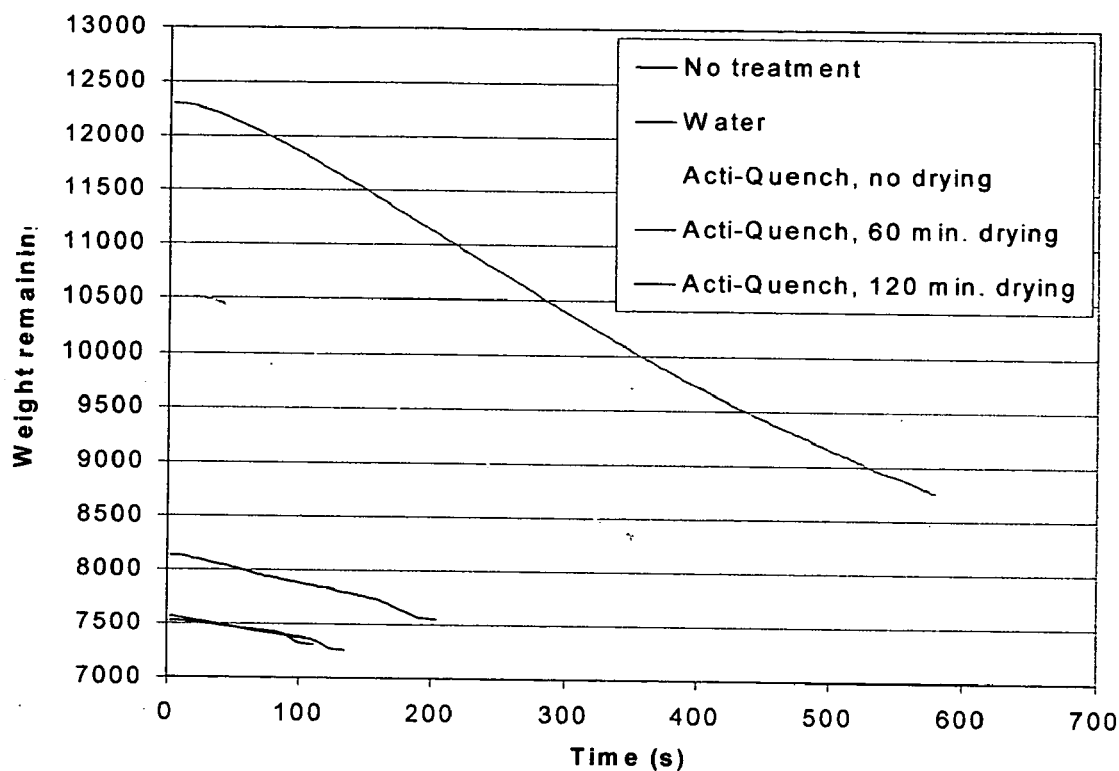
Figure 1 Typical mass remaining results, until ignition, at 25 kW/m$^2$

SUMMARY

Ignition delay times for non-dried applications of the three products on latex painted T1-11 siding are about the same for all three products at 25 kW/m² of irradiance. Acti-Quench™ appears to perform better (delay times are longer) than the other two products at 15 kW/m² irradiance.

Ignition delay times for 60 minute dried specimens exposed to 25 kW/m² irradiance appear about the same for all three products or slightly better for Acti-Quench™. The performance of the Nochar and Acti-Quench™ materials appears to be about the same, while the Barricade material is less effective, for 60 minute dried specimens exposed to 15 kW/m² irradiance. More tests of Barricade and Nochar products would be necessary for a more reliable effectiveness determination of these two products.

Taking into account the drying used for Acti-Quench™ and not for the other two products, the effectiveness of the Nochar and Acti-Quench™ materials appear to be about the same, while the Barricade material appears to be less effective when applied on vinyl. The effectiveness of all three materials appears to be about the same when applied on window glass.

Ignition temperatures between the untreated wood and water treated wood and Acti-Quench™ treated specimens does not appear to differ significantly indicating the presence of Acti-Quench™ does not raise the ignition temperature of wood.

Mass loss rates for the non-dried and 60 minutes dried Acti-Quench™ treated specimens are higher than the untreated, water treated, and Acti-Quench™ treated and 120 minutes dried specimens. This indicates that the presence of wet Acti-Quench™ contributes to somewhat faster drying in comparison to when no Acti-Quench™ is present or is already relatively dry when exposed. This effect was not shown for the Barricade and Nochar products.

REFERENCE

[1] A. F. Grand, M. Mehrafza, Fire and Materials 2001, 7th International Conference and Exhibition, Proceedings, Interscience Communications Limited, Jan. 22–24, 2001, San Antonio, TX 241–248, pp, 2001.

Acti-Quench Used as a Firebreak:

Anti-Quench can be sprayed in advance of a fire to coat structures like bushes, shrubs and trees. Applying Acti-Quench will quench and retard fire, thus, allowing firefighters to extinguish flames without the further advancement of fire. Acti-Quench used as a firebreak results in significantly less damage than conventional means, such as, using bulldozers or controlled burning to clear a firebreak area.

Other potential Acti-Quench Applications:

Acti-Quench is suitable for landfill and burning tire fires. Burning organic liquids can equally be sequestered by adding Acti-Quench as a naturally thickening additive. Adding Acti-quench to the surface of a flaming organic liquid will absorb liquid spread and curtail potential environmental damage.

Obviously, many modifications may be made without departing from the basic spirit of the present invention. Accordingly, it will be appreciated by those skilled in the art that within the scope of the appended claims, the invention may be practiced other than has been specifically described herein. The inventors do not wish to be bound by any theory and consider their invention to be that set forth in the claims.

What is claimed is:

1. A composition useful for providing a fire protective coating on surfaces by immobilizing water therein and producing evaporative cooling consisting essentially of about 5–15% Attapulgite clay, about 1–10% magnesium sulfate with water to make 100%.

2. The composition of claim 1 wherein the composition consists essentially of about 13.5–15% Attapulgite clay, about 1% magnesium sulfate and the balance water to make 100%.

3. The composition of claim 1 wherein the Attapulgite clay is purified micronized self-dispersing hydrous Attapulgite clay.

4. A method for preventing the advance of a fire and creating a fire-barrier comprising applying to the area to be protected from the advancing fire a fire-barrier composition consisting essentially of fire-barrier effective amounts of a composition of Attapulgite clay, Epsom salt and water.

5. The method of claim 4 wherein the fire-barrier composition consists essentially of, on a total weight basis 5–15% purified Attapulgite clay, 1–15% Epsom salt and water to make 100%.

6. The method of claim 4 wherein the fire-barrier composition on a total weight basis consists essentially of about 13.5 to 15% of micronized self-dispersing hydrous Attapulgite clay, about 1% Epsom salt and about 85% of water.

7. The method of claim 4 wherein the composition applied to the area to be protected is a quarter of an inch or greater.

8. The method of claim 4 wherein the area to be protected is around a land-fill.

9. The method of claim 4 wherein the area to be protected is the area around burning tires.

10. A method for fighting a fire consisting essentially of applying to said fire a composition of Attapulgite clay, Epsom salt and water in amounts effective to fight said fire.

* * * * *